(12) United States Patent
Lee et al.

(10) Patent No.: US 11,916,878 B2
(45) Date of Patent: Feb. 27, 2024

(54) APPARATUS AND METHOD FOR SECURITY OF INTERNET OF THINGS DEVICE

(71) Applicant: Electronics and Telecommunications Research Institute, Daejeon (KR)

(72) Inventors: Yun-Kyung Lee, Daejeon (KR); Kyeong Tae Kim, Sejong-si (KR); Young Ho Kim, Daejeon (KR); Jeong Nyeo Kim, Daejeon (KR); Seon-Gyoung Sohn, Daejeon (KR); Jae Deok Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 227 days.

(21) Appl. No.: 17/515,892

(22) Filed: Nov. 1, 2021

(65) Prior Publication Data
US 2022/0286433 A1    Sep. 8, 2022

(30) Foreign Application Priority Data

Mar. 4, 2021 (KR) .................. 10-2021-0028841

(51) Int. Cl.
*H04L 9/40* (2022.01)
(52) U.S. Cl.
CPC ...... *H04L 63/0245* (2013.01); *H04L 63/0263* (2013.01); *H04L 63/10* (2013.01); *H04L 63/108* (2013.01); *H04L 63/123* (2013.01); *H04L 63/20* (2013.01)

(58) Field of Classification Search
CPC . H04L 63/0245; H04L 63/0263; H04L 63/10; H04L 63/108; H04L 63/123; H04L 63/20
See application file for complete search history.

(56) References Cited

U.S. PATENT DOCUMENTS

| | | | |
|---|---|---|---|
| 2016/0212012 A1* | 7/2016 | Young | G06F 21/50 |
| 2018/0316673 A1* | 11/2018 | Shah | H04W 12/06 |
| 2020/0112515 A1* | 4/2020 | Brar | H04L 63/10 |
| 2020/0273586 A1* | 8/2020 | Lee | H04L 9/0891 |
| 2021/0029130 A1* | 1/2021 | Kale | H04L 63/0876 |

FOREIGN PATENT DOCUMENTS

| | | |
|---|---|---|
| JP | 2020-160984 A | 10/2020 |
| KR | 10-1263381 B1 | 5/2013 |
| KR | 10-1679578 B1 | 11/2016 |
| KR | 10-2020178 B1 | 9/2019 |
| KR | 10-2020-0054374 A | 5/2020 |
| KR | 10-2020-0113836 A | 10/2020 |
| KR | 10-2178305 B1 | 11/2020 |

* cited by examiner

*Primary Examiner* — Cheng-Feng Huang
(74) *Attorney, Agent, or Firm* — NSIP Law

(57) ABSTRACT

Disclosed are an apparatus and a method for Internet of Things (IoT) device security. The method includes unifying a port in a first IoT device for communication, receiving, by the first IoT device, a packet from a second IoT device through the port, identifying whether the packet in the first IoT device is in a preset packet form, verifying content of the packet in the first IoT device when the packet is in the preset packet form, and opening the port for providing a service in the first IoT device when the verifying of the packet content is successful.

13 Claims, 8 Drawing Sheets

APPARATUS AND METHOD FOR SECURITY OF INTERNET OF THINGS DEVICE

CROSS-REFERENCE TO RELATED APPLICATION

This application claims the benefit of Korean Patent Application No. 10-2021-0028841 filed on Mar. 4, 2021, at the Korean Intellectual Property Office, the entire disclosure of which is incorporated herein by reference for all purposes.

BACKGROUND

1. Field of the Invention

One or more example embodiments relate to a technology for an Internet of Things (IoT) device security.

2. Description of the Related Art

To allow users to conveniently use a service, an Internet environment has been created such that the users may easily access and use the service. However, by accessing the Internet, such service may be also used by hackers with malicious intent. As more services become available through a network connection, hackers may want to obtain more information. In addition, the number of targets attacked by hackers is increasing due to expansion of the Internet of Things (IoT) environment, and devices for providing services or used in the IoT environment may not be provided with a security feature due to limited resources.

SUMMARY

According to an aspect, there is provided a security method for communication between Internet of Things (IoT) devices, the security method including unifying a port in a first IoT device for communication, receiving, by the first IoT device, a packet from a second IoT device through the port, identifying whether the packet in the first IoT device is in a preset packet form, verifying content of the packet in the first IoT device when the packet is in the preset packet form, and opening the port for providing a service in the first IoT device when the verifying of the packet content is successful.

The port for providing the service may be closed after being opened for a preset period.

The identifying of whether the packet is in the preset packet form may include performance by a packet preprocessor of the first IoT device configured separately from an application program module of the first IoT device.

The unifying and the opening of the port may include performing the unifying and the opening of the port by changing a firewall policy of the first IoT device.

The verifying of the packet content may include performance by the application program module of the first IoT device.

The security method may further include relaying from the packet preprocessor to the application program module through a communication interface of the application program module for verifying the packet content in which the packet form is identified.

The security method may further include registering the first IoT device in a management server, and determining, by the management server, the port for communication.

According to another aspect, there is provided a security method for communication between IoT devices using a security apparatus, the security method including unifying a port in a security apparatus communicating with a first IoT device and a second IoT device for communicating with the first IoT device, receiving, by the security apparatus, a packet from the first IoT device through the port, identifying whether the packet in the security apparatus is in a preset packet form, relaying the packet to the second IoT device when the packet is in the preset packet form, verifying content of the packet from the second IoT device, and opening the port in the security apparatus for providing a service when the verifying of the packet content is successful.

The port for providing the service may be closed after being opened for a preset period.

The port for communication may be determined by a management server communicating with the security apparatus.

According to another aspect, there is provided an IoT device including a network interface configured to communicate with an external device, a packet preprocessor configured to control an access of an application program module based on a packet form of a packet received from the external device through the network interface, and the application program module configured to verify content of a packet in a preset packet form and provide a service. The packet preprocessor may unify a port for communication with the external device of the network interface, determine whether the packet received through the port is in the preset packet form, and relay the packet to the application program module when the packet is in the preset packet form. The application program module may include verifying the packet content.

The packet preprocessor may open the port for providing the service when the verifying of the packet content is performed.

The port for providing the service may close after being opened for a preset period. The port for communication may be determined by a management server communicating with the IoT device.

The packet preprocessor may relay a service request packet to the application program module when the service request packet is received through the network interface from the external device that successfully relayed the verified packet.

The packet form may include a code for verifying that the packet is received, an identification (ID) of the external device, a destination Internet protocol (IP) address of the packet, a certified value for verifying an integrity of the packet, a random value for preventing the packet from being relayed again, and unique device information for verifying a device from which the packet is generated.

Additional aspects of example embodiments will be set forth in part in the description which follows and, in part, will be apparent from the description, or may be learned by practice of the disclosure.

According to example embodiments, an apparatus and a method for an Internet of Things (IoT) device security may in advance block unnecessary packets that arrive at IoT devices connected to a network, thereby reducing resources used by the IoT devices to process such packets.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
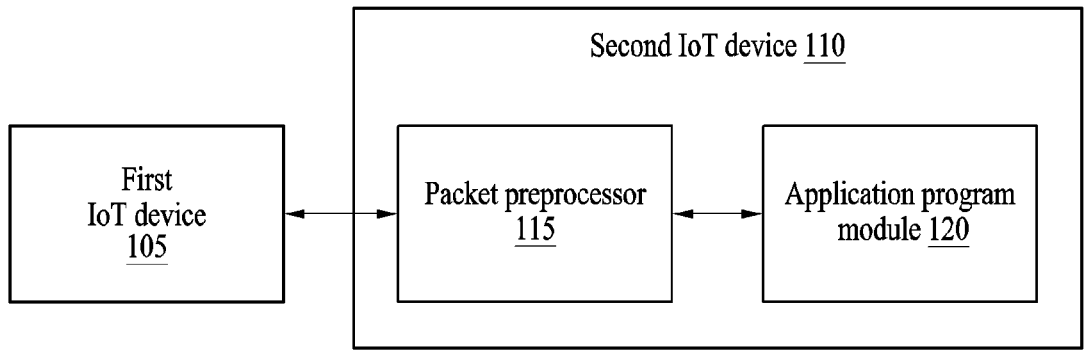
FIG. 1 is a diagram illustrating an overall example of a security apparatus for an Internet of Things (IoT) device according to an example embodiment.

Hereinafter, example embodiments will be described in detail with reference to the accompanying drawings. However, various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In addition, terms such as first, second, A, B, (a), (b), and the like may be used herein to describe components. Each of these terminologies is not used to define an essence, order, or sequence of a corresponding component but used merely to distinguish the corresponding component from other component(s). Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

In the description of example embodiments, detailed description of structures or functions that are thereby known after an understanding of the disclosure of the present application will be omitted when it is deemed that such description will cause ambiguous interpretation of the example embodiments. Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

FIG. 1 is a diagram illustrating an overall example of a security apparatus for an Internet of Things (IoT) device according to an example embodiment.

An IoT device network may include an IoT device and a management server (not shown) that manages the IoT device. The IoT device may use a firewall function provided by an operating system (OS) of the IoT device itself for blocking unnecessary packets received by the IoT device (e.g., a second IoT device 110). The IoT device may include a packet preprocessor 115 as a security apparatus for the IoT device to apply a firewall policy to a firewall of the IoT device for blocking the unnecessary packets including attack packets received by the IoT device.

Referring to FIG. 1, a second IoT device 110 may communicate with a first IoT device 105. The second IoT device 110 may include an application program module 120 and a packet preprocessor 115 as the security apparatus for the IoT device.

The packet preprocessor 115 may be downloaded to the IoT device or be installed as a basic program in a factory at the time the IoT device is registered in the management server. The packet preprocessor 115 may be updated based on a policy of the management server.

Communication between the first IoT device 105 and the second IoT device 110 may be performed through the packet preprocessor 115. The first IoT device 105 may transmit a packet to be transmitted to the packet preprocessor 115. Such packet may be a pre-verified packet for verifying the first IoT device 105. The transmitted packet may be received by the packet preprocessor 115 in the second IoT device 110. The packet preprocessor 115 may identify whether the received packet is in a packet form for verifying a device that transmitted the packet. The packet form for verifying the device that transmitted the packet may be preset.

The pre-verified packet having the preset packet form may be distributed by the management server to the IoT device registered in the management server. When the IoT device registered in the management server communicates with other IoT devices registered in the management server, the IoT device may in advance transmit the pre-verified packet in the preset packet form such that the device that transmitted the packet may be verified. The packet form is described in detail below with reference to FIG. 5.

When the received packet is not in the pre-verified packet form, the packet preprocessor 115 that received the packet may not relay the received packet to the application module

120 in the second IoT device 110. Thus, the second IoT device 110 may in advance block unnecessary incoming packets, thereby reducing resources of the IoT device used to process unnecessary packets and improving device security.

When the received packet is in the pre-verified packet form, the packet preprocessor 115 may relay the received packet to the application program module 120 for verifying the received packet. The packet preprocessor 115 may relay the received packet through a communication interface in the application program module 120. The application program module 120 that receives the packet may verify content of the packet.

When the packet content is not successfully verified, the application program module 120 may not perform any operation. When the packet preprocessor 115 does not receive any response from the application program module 120, the packet preprocessor 115 may continue to receive the packet through a unified port and verify the packet form.

When the packet content is successfully verified, the application program module 120 may relay the result of the verifying to the packet preprocessor 115. When the packet content is successfully verified, the packet preprocessor 115 may relay the packet transmitted from the first IoT device 105 that transmitted the packet in which the packet content is successfully verified (that is, a pre-verified packet) to the application program module 120. The packet preprocessor 115 may relay the packet transmitted from the first IoT device 105 that transmitted the pre-verified packet in which the content is successfully verified to a port having a destination port number included in the pre-verified packet in which the packet content is successfully verified. The packet preprocessor 115 may relay the packet relayed from the first IoT device 105 only at a time requested by the application program module 120.

In another example, the packet preprocessor 115 may verify the packet content. When the packet content is verified in the packet preprocessor 115 and the packet content is successfully verified, the packet preprocessor 115 may relay the packet transmitted from the first IoT device 105 transmitting the packet in which the packet content is successfully verified (that is, the pre-verified packet) to the port having the destination port number included in the pre-verified packet that has been successfully verified.

The packet preprocessor 115 may operate by being linked to a firewall of the IoT device. The packet preprocessor 115 may generate a policy (or a rule) to be applied to the firewall depending on circumstances, dynamically change a firewall policy, and apply the firewall policy to the firewall.

The packet preprocessor 115 may set only one port among communication ports to be opened and unify a port as the firewall policy. According to an example embodiment, the port number of the port to be opened may be changed by the management server for improving security. The management server may make a request to change the port number of the port to be opened to the second IoT device, and the packet preprocessor 115 in the second IoT device may change one port to be opened.

When a preset number or more of pre-verified packets are sent from the same device or received even if an Internet protocol (IP) address of a sending device is different, the packet preprocessor 115 may generate the firewall policy and close the unified port to protect IoT devices from distributed denial of service (DDoS) attacks. After a preset time elapses, the packet preprocessor 115 may reopen the closed port by applying a new firewall policy.

Only pre-verified IoT devices, before allowing a communication connection between the IoT devices by controlling the firewall provided by an IoT device itself, may receive and relay the packet for a preset time period, and thus an attack packet may not be allowed to access the IoT device based on the security apparatus for the IoT device (e.g., the packet preprocessor 115).

The security apparatus for the IoT device (e.g., the packet preprocessor 115) may be applied in various IoT environments and be applied in an environment in which a subject managing the IoT devices is present (e.g., power and water remote meter reading infrastructure, closed circuit television (CCTV) management infrastructure, cooperative intelligent transportation systems (C-ITS) traffic management infrastructure, a smart home, a smart building, and a smart city) for protecting IoT infrastructure.

Figure 2:
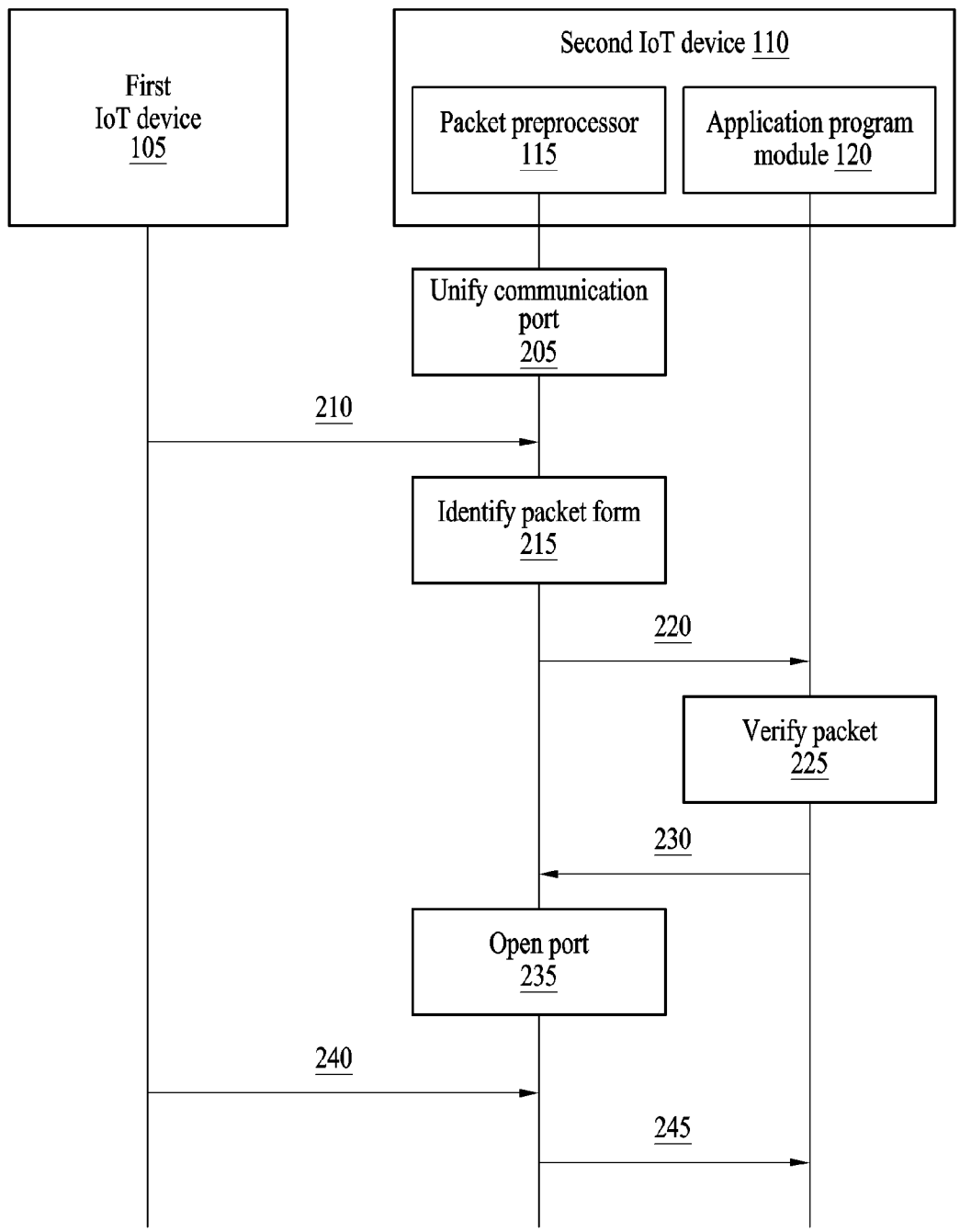
FIG. 2 is a diagram illustrating an example of operations of a security method for an IoT device according to an example embodiment.

FIG. 2 is a diagram illustrating an example of operations of a security method for an IoT device according to an example embodiment.

An example of operations of the second IoT device 110 communicating with the first IoT device 105, and operations of such two devices communicating with each other may be illustrated in FIG. 2.

The packet preprocessor 115 may drop all existing packets, open only one port, and unify a communication port in operation 205. For example, the packet preprocessor 115 illustrated in FIG. 1 may open only a first port. The communication port may be unified by applying a firewall policy generated by the packet preprocessor 115.

The first IoT device 105 may transmit a packet to the second IoT device 110 through the unified port in operation 210.

The packet preprocessor 115 in the second IoT device 110 may receive the transmitted packet in operation 215. The packet preprocessor 115 may identify a packet form of the received packet and verify whether the packet form is in a pre-verified packet form. When the received packet is not in the pre-verified packet form, the packet preprocessor 115 may drop the received packet without relaying the received packet to the application program module 120.

When the received packet is in the pre-verified packet form, the packet preprocessor 115 may relay the received packet to the application program module 120 for verifying the packet content in operation 220.

The application program module 120 may verify the relayed packet content in operation 225. When the packet content is successfully verified, the application program module 120 may relay the result of the verifying to the packet preprocessor 115 in operation 230. When the packet content is not successfully verified, the application program module 120 may not perform any operation. Thus, when the packet content is not successfully verified, the packet preprocessor 115 may continue to receive the packet through the unified port and verify the packet form.

When the packet content is successfully verified, the packet preprocessor 115 may open the port to receive a packet requesting information and a service provided by the first IoT device 105 in operation 235. For example, the packet preprocessor 115 may open a second port.

The first IoT device 105 may transmit a service request packet through an open port (e.g., the second port) in operation 240.

The packet preprocessor 115 may relay the service request packet received through the open port to the application program module 120 in operation 245.

Figure 3:
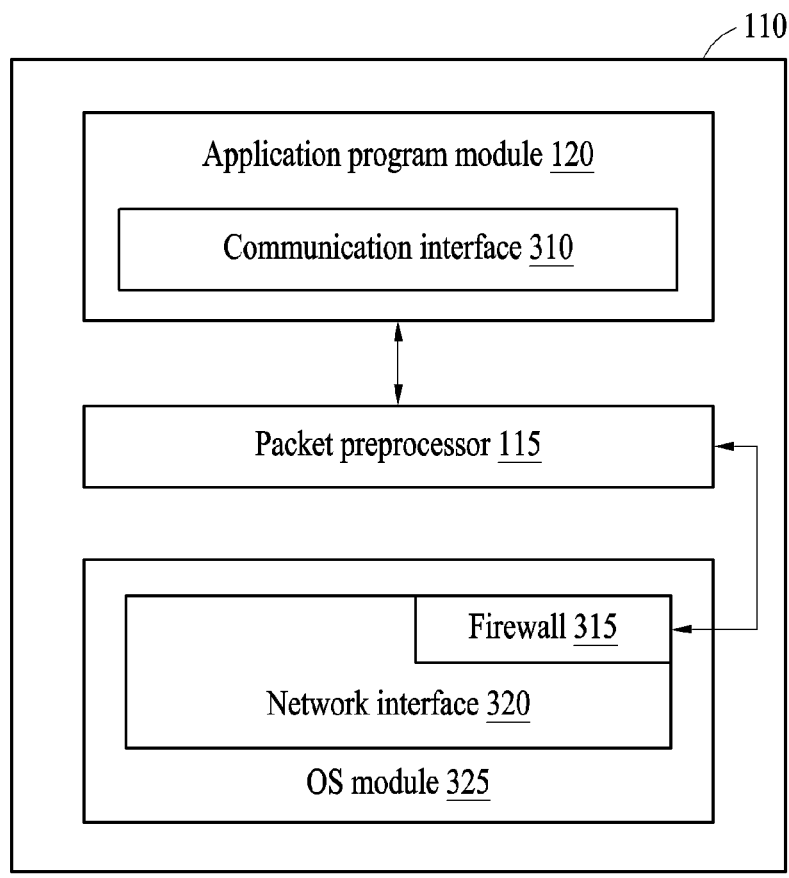
FIG. 3 is a diagram illustrating an example of a security apparatus for an IoT device according to an example embodiment.

FIG. 3 is a diagram illustrating an example of a security apparatus for an IoT device according to an example embodiment.

Referring to FIG. 3, the second IoT device 110 illustrated in FIG. 1 may include the packet preprocessor 115 as the security apparatus for the IoT device.

In addition to the application program module 120 and an operating system (OS) module 325 included in a general IoT device, the second IoT device 110 may include a packet preprocessor 115. The general IoT device may communicate through a network interface 320 of the OS module 325 and the communication interface 310 in the application program module 120. The packet preprocessor 115 may be disposed between the OS module 325 and the application program module 120 to communicate with the network interface 320 in the OS module 325 and the communication interface 310 in the application program module 120. Even when the packet preprocessor 115 is added to the IoT device through a method of relaying a packet to the communication interface 310 in the application program module 120, an unnecessary packet including an attack packet of the second IoT device 110 may be blocked without the application program module 120 being modified.

The packet preprocessor 115 may add an executable file of the packet preprocessor 115 to the second IoT device 110 and be installed in the second IoT device 110. The executable file of the packet preprocessor 115 may be relayed from a management server to the second IoT device 110.

The packet preprocessor 115 may set a firewall policy and apply the firewall policy to a firewall 315 of the network interface 320. For example, the packet preprocessor 115 may establish the firewall policy to unify the port for receiving the pre-verified packet from another IoT device and apply the firewall policy to the firewall 315 of the network interface 320. A port number of the unified port may be determined by the management server. According to an example embodiment, the management server may relay a packet that makes a request to change a unified port to the second IoT device 110. The packet preprocessor 115 in the second IoT device 110 may change the unified port to a port having a port number included in a packet to request a port change. According to an example embodiment, the port may be changed by updating the executable file of the packet preprocessor itself or by modifying a configuration (config) file.

Figure 4:
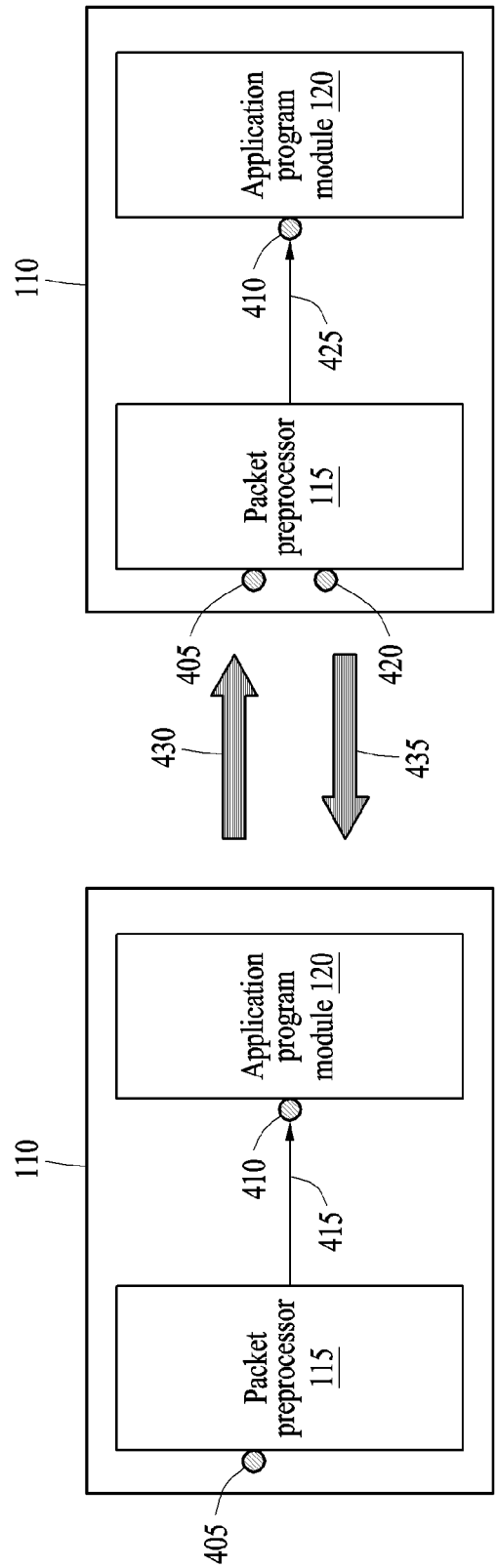
FIG. 4 is a diagram illustrating an example of operations between a packet preprocessor and an application program module in an IoT device according to an example embodiment.

FIG. 4 is a diagram illustrating an example of operations between the packet preprocessor 115 and the application program module 120 in the second IoT device 110 according to an example embodiment.

Referring to FIG. 4, the packet preprocessor 115 may receive a pre-verified packet through a unified port (or a first port 405) and relay the received packet to the application program module 120 through a port 410 of a communication interface of the application program module 120 in operation 415. After the pre-verified packet content is successfully verified in operation 430, the received packet may be relayed to the application program module 120 through an open port 420 in operation 425.

The packet preprocessor 115 may generate a firewall policy, apply the firewall policy to a firewall (not shown) (e.g., the firewall 315 in FIG. 3), and unify a communication port. The packet preprocessor 115 may close all ports excluding the first port 405.

The packet preprocessor 115 may receive a packet from another device through the first port 405. The packet preprocessor 115 may identify whether the received packet is in a pre-verified packet form.

When the received packet is not in the pre-verified packet form, the packet preprocessor 115 may drop the packet without relaying the packet to the application program module 120.

When the received packet is in the pre-verified packet form, the packet preprocessor 115 may relay the packet to the application program module 120 for verifying content of the packet. The packet may be relayed through a second port 410. The second port 410 may be used for communication between a network interface in a general IoT device and the communication interface in the application program module 120.

The application program module 120 may verify the packet content. When the packet content is successfully verified, the application program module 120 may relay the result of the verifying to the packet preprocessor 115. When the packet content is not successfully verified, the application program module 120 may not perform any operation. When the packet content is not successfully verified, the packet preprocessor 115 may not receive any response from the application program module 120, and thus continue to receive the packet only through the first port 405 and verify the packet form of the received packet.

When the packet content is successfully verified, the packet preprocessor 115 may generate a new firewall policy and apply the new firewall policy to the firewall to open a third port 420 for receiving a packet that requests information and a service provided by the IoT device that transmitted the packet in which the packet content is successfully verified.

The packet preprocessor 115 may receive the packet including the information and service request from the IoT device transmitting the packet in which the packet content is successfully verified through the third port 420. The packet preprocessor 115 may relay the packet to the application program module 120 through the second port 410.

When the third port 420 is opened and a preset time (e.g., a session time) elapses, the packet preprocessor 115 may generate the new firewall policy and apply the new firewall policy to the firewall such that the third port 420 may be closed in operation 435. According to an example embodiment, the preset time may be requested by the application program module 120.

To improve security, a port number of the unified port may be changed. The port number to be changed may be relayed from the management server.

Figure 5:
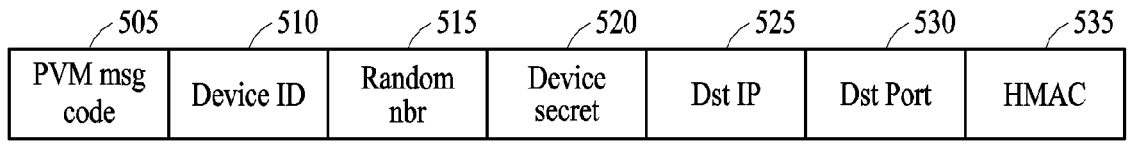
FIG. 5 is a diagram illustrating an example of a packet form of a pre-verified packet according to an example embodiment.

FIG. 5 is a diagram illustrating an example of a packet form of a pre-verified packet according to an example embodiment.

Referring to FIG. 5, a pre-verified packet form may include a code 505 for verifying the pre-verified packet, an identification (ID) 510 of a device that transmitted the pre-verified packet, a destination Internet protocol (IP) address 525 of the pre-verified packet, a destination port number 530, a code 535 for verifying integrity of the pre-verified packet, a random value 515 for blocking a packet from a retransmitted attack using the pre-verified packet, and unique device information 520 for verifying a device that generated the pre-verified packet.

According to an example embodiment, the code 535 for verifying integrity of the pre-verified packet may be a hashed message authentication code (HMAC).

To improve security, the random value 515 and the unique device information 520 may be encrypted.

When communication between IoT devices registered in the management server is performed, the IoT device (e.g., the first IoT device 105 illustrated in FIG. 1) to which the packet is to be transmitted may first relay the pre-verified packet to another IoT device (e.g., the second IoT device 110).

Other IoT devices receiving the packet may verify whether the received packet is in the pre-verified packet form. A packet preprocessor of another IoT device receiving the packet may include the code 505 for verifying whether the received packet is the pre-verified packet, the ID 510 of the device, the destination IP address 525, the destination port number 530, the code 535 for verifying integrity, the random value 515, and unique device information 520.

When the received packet is in the pre-verified packet form, the packet preprocessor may relay the packet to the application program module for verifying the packet content. The application program module may verify the packet content based on the code 505 for verifying the pre-verified packet, the ID 510 of the device, the destination IP address 525, the destination port number 530, the code 535 for verifying integrity, the random value 515, and unique device information 520.

Figure 6:
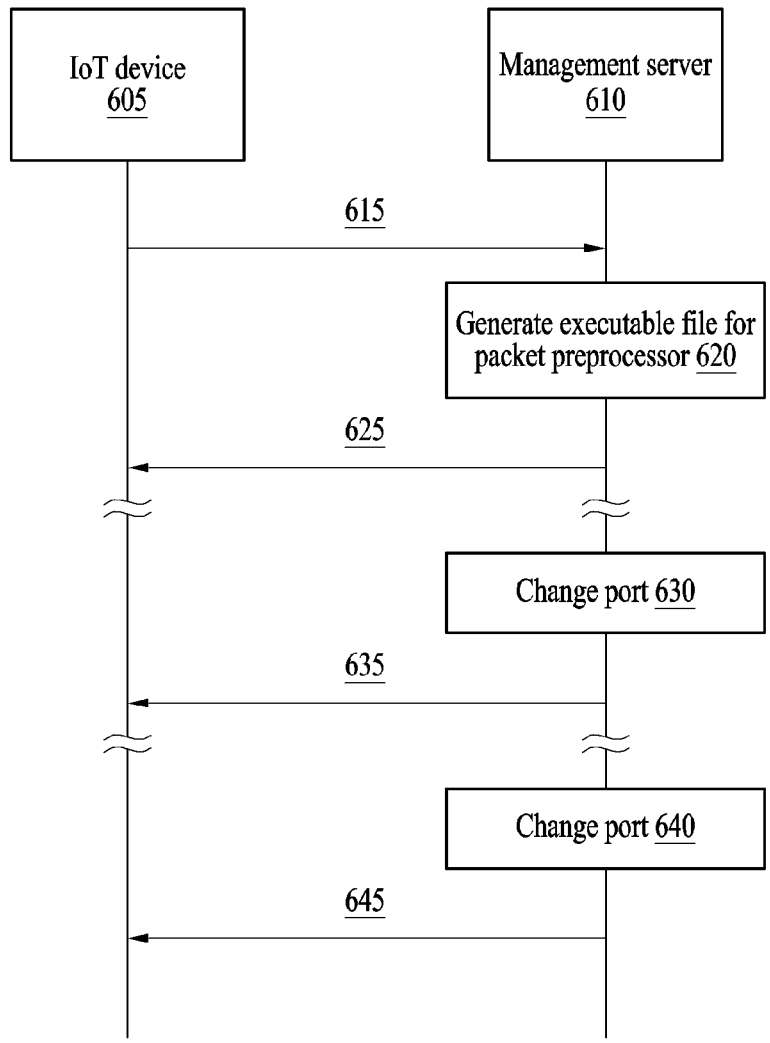
FIG. 6 is a diagram illustrating an example of an operation of registering an IoT device to a management server according to an example embodiment.

FIG. 6 is a diagram illustrating an example of an operation of registering the IoT device to a management server according to an example embodiment.

According to an example embodiment, a management server 610 may be disposed at a location where IoT devices are installed and manage the IoT devices at the location where the management server 610 is installed. Before an IoT device is installed, the IoT device may be registered in the management server 610.

An IoT device 605 (e.g., the second IoT device 110 illustrated in FIG. 1) may be registered in the management server 610 in operation 615. When registering the IoT device 605, at least one of an IP address to be used, a port number to be used for communication with other IoT devices, a device ID, and a device password may be input.

The management server 610 may generate an executable file of a packet preprocessor (e.g., the packet preprocessor 115 illustrated in FIG. 1) in operation 620. The management server 610 may determine the port number to be used by the packet preprocessor installed in the IoT device 605 for receiving a pre-verified packet.

The generated executable file of the packet preprocessor, the pre-verified packet to be used by the IoT device 605, and the port number to be used by the IoT device 605 for receiving the pre-verified packet may be transmitted to the IoT device 605 through a communication interface of the IoT device 605 in operation 625. The packet preprocessor may be executed in the IoT device 605 receiving the executable file of the packet preprocessor, and a communication port may be unified to a port having the port number received from the management server 610 to be used for receiving the pre-verified packet. The registered IoT device 605 and the second IoT device 110 illustrated in FIG. 2 may operate in similar ways. Thus, a more detailed description of the operations is not included here, for brevity.

The management server 610 may change the port unified by the packet preprocessor in operation 630. The management server 610 may relay, to the IoT device 605, the executable file of the packet preprocessor generated based on the changed port number, the pre-verified packet to be used by the IoT device 605, and the changed port number of the IoT device 605 through the communication interface of the IoT device 605 in operation 635. According to an example embodiment, the executable file of the packet preprocessor in the IoT device 605 may be updated through a firmware update function of the IoT device 605.

The described processes in operations 630 and 635 may be repeated in operations 640 and 645 to improve security. The processes in the operations 630 and 635 may be repeated as necessary. For example, the processes in the operations 630 and 635 may be performed periodically.

Figure 7:
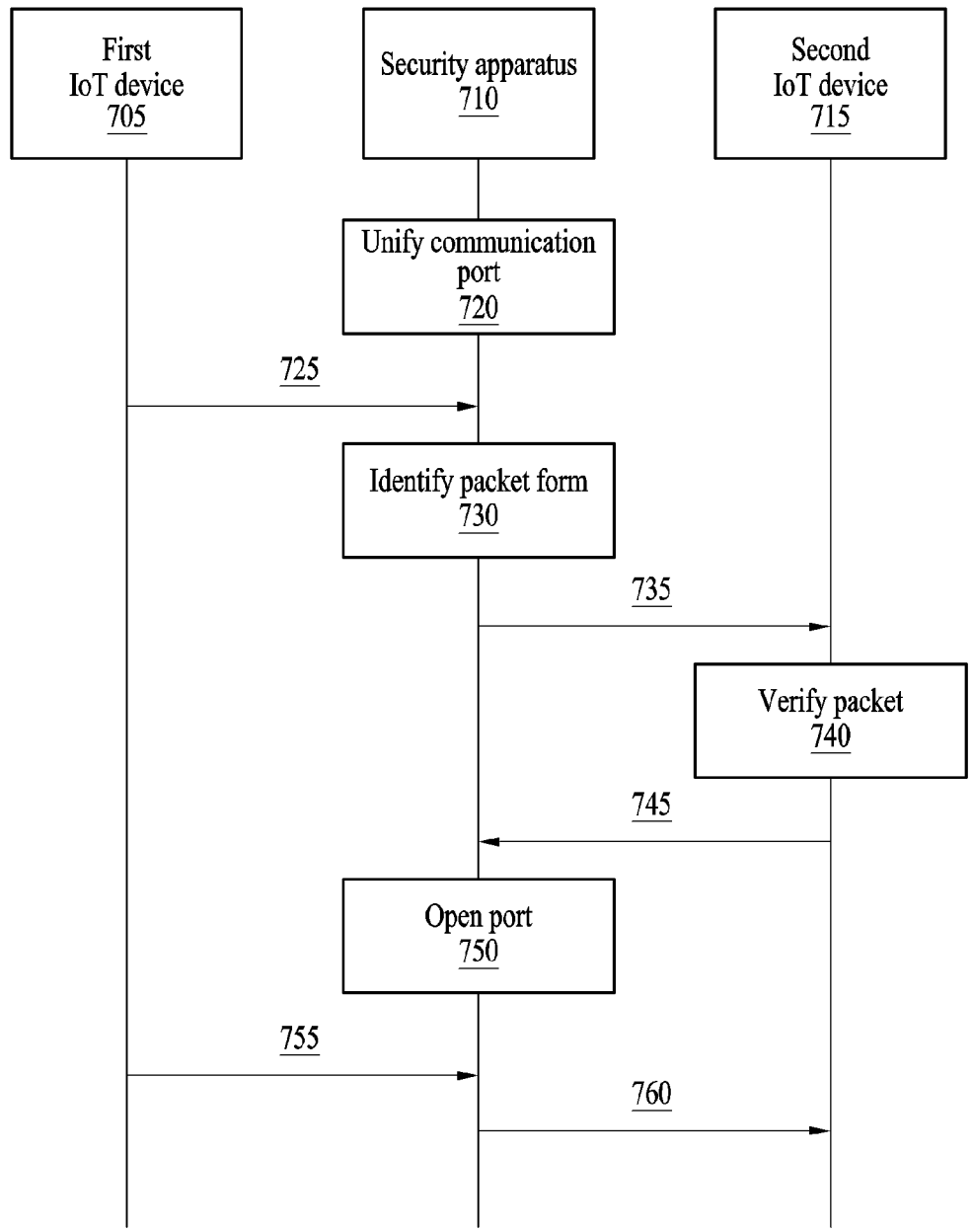
FIG. 7 is a diagram illustrating an example of an operation of a security method for an IoT device according to an example embodiment.

FIG. 7 is a diagram illustrating an example of an operation of a security method for an IoT device according to an example embodiment.

Depending on performance and communication method, some IoT devices may not provide a firewall function. When the IoT device does not provide a firewall function, a separate security apparatus 710 may be used to prevent unnecessary packets such as attack packets from being received. The security apparatus 710 may provide a function provided by a packet preprocessor (e.g., the packet preprocessor 115 illustrated in FIG. 1) and the firewall function.

An example of a second IoT device 715 without a firewall function, the security apparatus 710 that controls communication between a first IoT device 705 and the second IoT device 715, and a first IoT device 705 that transmits a request for communication with the second IoT device 715 to the security apparatus 710 may be illustrated in FIG. 7.

The security apparatus 710 may drop all existing packets, open one port, and unify a communication port in operation 720. For example, the security apparatus 710 may open only a first port. According to an example embodiment, the unified communication port may be determined by a management server. The communication port may be unified by applying a firewall policy generated by the security apparatus 710 to a firewall of the security apparatus 710.

The first IoT device 705 may transmit a packet to the security apparatus 710 through the unified port in operation 725.

The security apparatus 710 may receive the packet from the first IoT device 705 in operation 730. The security apparatus 710 may verify whether the received packet is in a pre-verified packet form by verifying the received packet. When the received packet is not in the pre-verified packet form, the security apparatus 710 may drop the received packet and not relay the received packet to the second IoT device 715.

When the received packet is in the pre-verified packet form, the security apparatus 710 may relay the packet to the second IoT device 715 for verifying the packet content in operation 735. The packet may be relayed through a communication interface of the second IoT device 715.

The second IoT device 715 may verify the packet content of the relayed packet in operation 740. According to an example embodiment, the packet content may be verified in an application program module in the second IoT device 715. When the packet content is successfully verified, the result of the verifying may be relayed to the security apparatus 710 in operation 745. When the packet content is not successfully verified, the second IoT device 715 may not perform any operation. Thus, when the packet content is not successfully verified, the security apparatus 710 may continue to receive the packet through the unified port and verify the packet form.

When the packet content is successfully verified, the security apparatus 710 may open a port for receiving a packet requesting information and a service provided by the first IoT device 705 in operation 750. For example, the security apparatus 710 may open a second port.

The first IoT device 705 may transmit a service request packet through an open port (e.g., a second port) in operation 755.

The security apparatus 710 may relay the service request packet received through the open port to the second IoT device 715 in operation 760.

Figure 8:
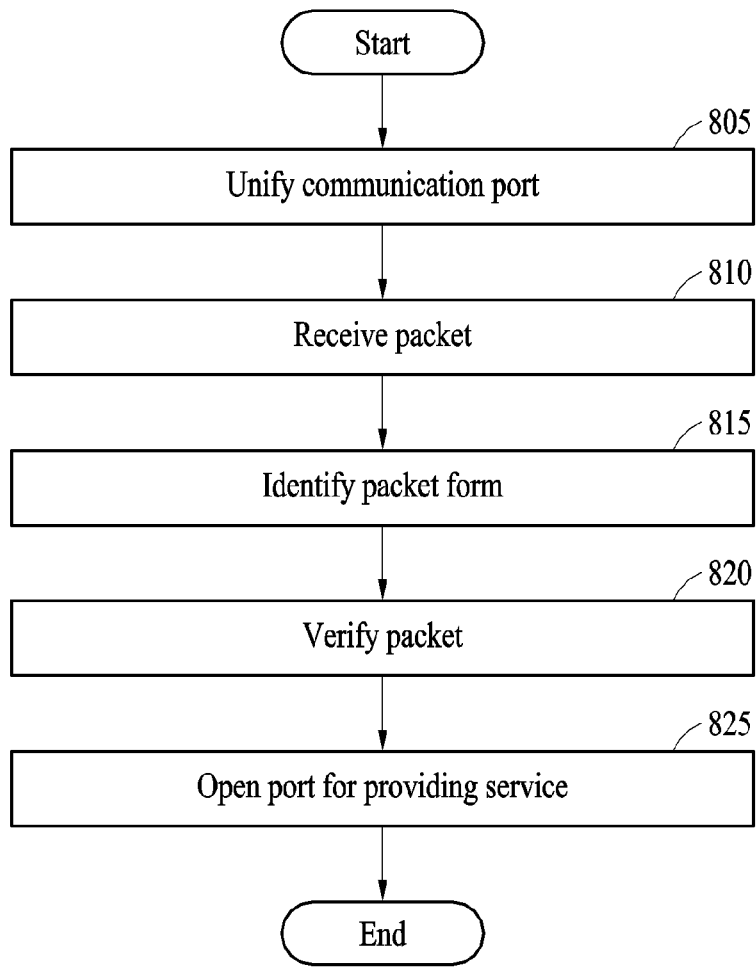
FIG. 8 is a diagram illustrating an example of a security method of a security apparatus for an IoT device according to an example embodiment.

FIG. 8 is a diagram illustrating an example of a security method of a security apparatus for an IoT device according to an example embodiment.

An example of a security method for an IoT device performed by a security apparatus for an IoT device may be illustrated in FIG. 8.

The security apparatus for the IoT device may drop all existing packets and unify ports into one port for communication between IoT devices in operation 805. For example, the security apparatus for the IoT device may open only a first port. The security apparatus for the IoT device may generate a firewall policy and apply the firewall policy to a firewall of the IoT device, and the communication port may be unified by the security apparatus for the IoT device.

The security apparatus for the IoT device may receive a packet from another IoT device in operation 810.

The security apparatus for the IoT device (e.g., the packet preprocessor 115 illustrated in FIG. 1) may verify whether a packet form of the received packet corresponds to the pre-verified packet in operation 815. When the packet form of the received packet does not correspond to the pre-verified packet form, the security apparatus for the IoT device may drop the packet and not relay the packet to the application module in the IoT device. Thus, the IoT device may verify whether a device transmitting the packet is previously registered in the management server, and by communicating only with a device registered in advance, security may be improved. The security apparatus for the IoT device may drop the packet not in the pre-verified packet form, and thus prevent resources from being unnecessarily consumed by the IoT device.

When the received packet form corresponds to the pre-verified packet form, the security apparatus for the IoT device may relay the packet to the application program module of the IoT device for verifying the packet content. The packet may be relayed through the communication interface in the application program module.

The IoT device that received the packet may verify the packet content through the application program module in the IoT device in operation 820. When the packet content is successfully verified, the application program module in the IoT device may relay the result of the verifying to the security apparatus for the IoT device. When the packet content is not successfully verified, the application program module in the IoT device may not perform any operation. When the security apparatus for the IoT device does not receive any response from the application module in the IoT device, the security apparatus for the IoT device may continue to receive the packet through the unified port and verify the packet form.

When the security apparatus for the IoT device receives the result of the verifying from the application program module in the IoT device, the security apparatus for the IoT device may open a port for receiving a packet including information provided by another IoT device that transmitted the packet and a service provision request packet in operation 825. For example, the security apparatus for the IoT device may open a second port. When the security apparatus for the IoT device generates a new firewall policy and applies the firewall policy to the firewall of the IoT device, a port may be opened. After a preset time elapses, an open port may be closed. The preset time may be a time requested by the IoT device. After the preset time elapses, the security apparatus for the IoT device may generate the new firewall policy, apply the firewall policy to the firewall of the IoT device, and close the open port.

The security apparatus for the IoT device may relay the packet relayed from another IoT device that transmitted the packet to an application program module in the IoT device.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter.

The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A security method for communication between Internet of Things (IoT) devices, the security method comprising:
   unifying a port in a first IoT device for communication;
   receiving, by the first IoT device, a packet from a second IoT device through the port;
   identifying whether the packet received by the first IoT device is in a preset packet form;
   verifying content of the packet received by the first IoT device when the packet is in the preset packet form; and
   opening the port for providing a service in the first IoT device when the verifying of the packet content is successful,
   wherein the port for providing the service is closed after being opened for a preset period.

2. The security method of claim 1, wherein the identifying of whether the packet is in the preset packet form comprises performance by a packet preprocessor of the first IoT device configured separately from an application program module of the first IoT device.

3. The security method of claim 2, wherein the verifying of the packet content comprises performance by the application program module of the first IoT device.

4. The security method of claim 3, further comprising:
   relaying from the packet preprocessor to the application program module through a communication interface of the application program module for verifying the packet content in which the packet form is identified.

5. The security method of claim 1, wherein the unifying and the opening of the port comprises performing the unifying and the opening of the port by changing a firewall policy of the first IoT device.

6. The security method of claim 1, further comprising:
   registering the first IoT device in a management server; and
   determining, by the management server, the port for communication.

7. A security method for communication between Internet of Things (IoT) devices using a security apparatus, the security method comprising:
   unifying a port in a security apparatus communicating with a first IoT device and a second IoT device for communicating with the first IoT device;
   receiving, by the security apparatus, a packet from the first IoT device through the port;
   identifying whether the packet in the security apparatus is in a preset packet form;
   relaying the packet to the second IoT device when the packet is in the preset packet form;
   verifying content of the packet by the second IoT device; and
   opening the port in the security apparatus for providing a service when the verifying of the content of the packet is successful, and
   wherein the port for providing the service is closed after being opened for a preset period.

8. The security method of claim 7, wherein the port for communication is determined by a management server communicating with the security apparatus.

9. An Internet of Things (IoT) device, comprising:
   a network interface configured to allow the IoT device to communicate with an external device;
   a communication port;
   a packet preprocessor configured to:
      control an access of an application program module based on a packet form of a packet received from the external device through the network interface, the application program module configured to verify whether content of a packet is in a preset packet form, and upon verification, provide a service;
      unify the communication port for communication with the external device of the network interface;
      determine whether the packet received through the port is in the preset packet form; and
      relay the packet to the application program module when the packet is in the preset packet form,
   wherein the application program module comprises verifying the packet content, and
   wherein the communication port for providing the service closes after being opened for a preset period.

10. The IoT device of claim 9, wherein the packet preprocessor is further configured to open the communication port for providing the service when the verifying of the packet content is successful.

11. The IoT device of claim 10, wherein the packet preprocessor is further configured to relay a service request packet to the application program module when the service request packet is received through the network interface from the external device that successfully relayed the verified packet.

12. The IoT device of claim 10, wherein the packet form comprises:
   a code for verifying that the packet is received;
   an identification (ID) of the external device;
   a destination Internet protocol (IP) address of the packet;
   a certified value for verifying an integrity of the packet;
   a random value for preventing the packet from being relayed again; and
   unique device information for verifying a device from which the packet is generated.

13. The IoT device of claim 9, wherein the communication port for communication is determined by a management server communicating with the IoT device.

* * * * *